Dec. 27, 1955  H. HETTICH  2,728,188
BALANCE WHEEL AND HAIRSPRING ASSEMBLY
Filed March 17, 1953
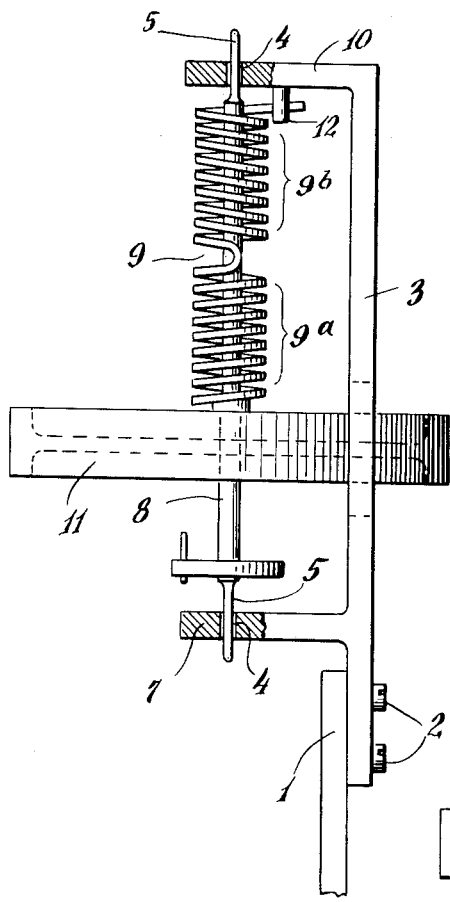
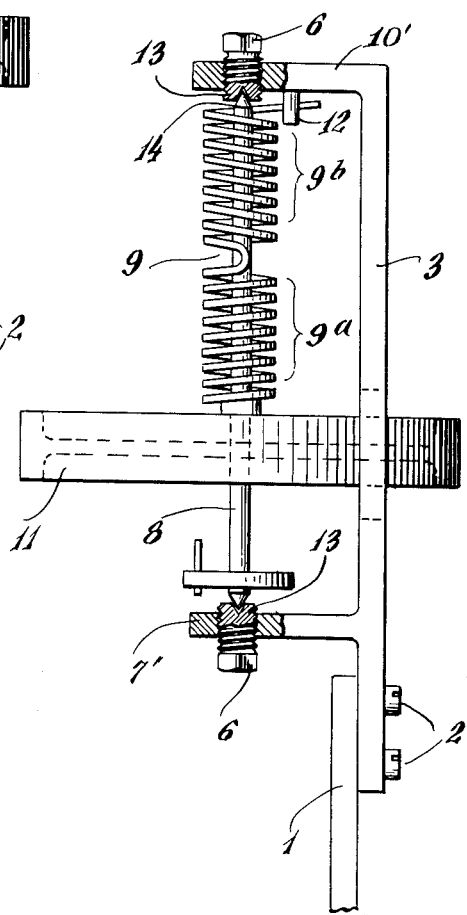
INVENTOR.
Hugo Hettich United States Patent Office 2,728,188
Patented Dec. 27, 1955

2,728,188

BALANCE WHEEL AND HAIRSPRING ASSEMBLY

Hugo Hettich, Ludwigshafen am Boden See, Germany

Application March 17, 1953, Serial No. 342,893

4 Claims. (Cl. 58—107)

The present invention relates to a precision instrument and more particularly to the provision of relatively heavy flywheel members in such instruments.

The principal difficulties encountered in the provision of relatively heavy flywheel elements in precision measuring instruments are of a mechanical nature involving, however, substantially costly remedies in the construction of bearings for these parts. For example, it has not been possible, up to this time, to use relatively heavy balance wheels in time measuring instruments such as clocks, chronometers and the like because the pressure at the bearings supporting the balance wheel causes too much friction and wear and because of the fragility of the bearing members. The risk of breakage of these bearing members can be substantially decreased if the balance wheel is arranged, as is conventional in marine chronometers, in such a manner that the axis of rotation thereof is vertical. A result of this arrangement is a substantially more uniform operation of the clock or the like, because the flywheel portion of the balance wheel moves in a horizontal plane, thus cancelling any influence which an eccentric center of gravity might have on isochronism.

Prior to the present invention, however, no satisfactory bearings had been designed for supporting a heavy balance wheel for rotation about a vertical axis, and no satisfactory solution could be adopted from the teaching of marine chronometers wherein the lower end of the flywheel element or balance wheel spindle is supported in a jewel which takes up the full weight of that element. Thus, the only suggestion which could be adopted from the construction of marine chronometers would be to provide costly jewel bearings and very accurately machined spindles of precision steel, and that is why the use of heavy balance wheels is avoided in the manufacture of marine chronometers in order to eliminate the costly bearings and the relatively high friction.

In accordance with the present invention it is possible to achieve the seemingly contradictory results of using relatively heavy flywheel elements such as balance wheels while mounting them for rotation on a vertical axis, and at the same time keeping the costs within reasonable economic proportions. These conditions are fulfilled by suspending the balance wheel from a compensating element and by guiding the spindle of the balance wheel only against movement directed transversely to the axis. In one form of the invention, if it is permissible for the balance wheel to perform slight vertical movements, bearings are provided which surround the spindle without supporting it vertically.

In another form of the invention, if the compensating element is so constructed as to permit rotary oscillation but to prevent axial movement, the ends of the spindle may be provided with hardened conical tips and lateral displacements of the spindle may be prevented by the provision of recessed bearings mating with the spindle tips. In this embodiment the arrangement of the parts must be such that the tension in the compensating element resulting from the weight of the balance wheel permits the lower tip of the spindle to engage in the recess of its associated bearing without, however, imparting any axial load thereto.

A particularly suitable compensating element for suspending the balance wheel while preventing any axial movement during oscillation thereof may be constructed in the form of a steel wire spring, the two halves of which are twisted in opposite directions.

When bearings are provided for flywheel elements in accordance with the present invention, the precision instrument has the advantage that it can operate for a relatively long period of time without any harmful effect on the parts even if insufficiently lubricated.

The invention will be more readily understood in connection with the accompanying drawings illustrating the balance wheel of a timepiece and in which:

Figure 1 is a diagrammatic view of part of a clock including the balance wheel and the bearings therefor in accordance with one form of the invention, and Figure 2 is a view similar to Figure 1 of another form of the invention.

In the form illustrated in Figure 1 the bearings surround the ends of the balance wheel spindle while in the form illustrated in Figure 2 the spindle is supported at its conical tips in mating axial bearings. For a better understanding of the invention, all parts of the mechanism which are not directly influenced thereby have been omitted.

As shown in Figure 1 the clock plate 1 supports by means of screws 2 a bracket 3 having lateral arms 7 and 10. Each arm is provided with a bore 4 which surrounds the corresponding tip 5 of the balance wheel spindle 8 but which does not support the spindle axially. The spindle 8 supports the flywheel 11 and is suspended by a coil spring 9 from a boss 12 on the arm 10.

The lower half 9a of the coil spring 9 is wound in the opposite direction to the upper half 9b, and this arrangement of the two halves of the spring 9 will prevent the vertical movements of the balance wheel because any shortening of one half of the spring will be compensated by lengthening of the other half. In other words, as the balance wheel oscillates about its axis, while one half of the spring is being unwound the other is being wound.

It is not absolutely essential to use this type of spring in the form of the invention illustrated in Figure 1 because the bearings shown in that figure permit vertical movement of the balance wheel.

In the form illustrated in Figure 2, however, it is essential to use this kind of spring. In this form of the invention the lateral arms 7' and 10' of the bracket 3 are provided with axial thrust bearings 13 positioned therein by screws 6. The thrust bearings 13 have conical recesses shaped therein to accommodate the conical tips 14 of the spindle 8. In order to avoid harmful pressure on the thrust bearings 13, and more particularly on the lower thrust bearing which would otherwise support the full weight of the balance wheel, it is necessary that the balance wheel and shaft be suspended by a spring 9 having oppositely wound halves 9a and 9b, but care should be taken that the conical tips 14 engage inside the recesses of the thrust bearings 13 in order to prevent lateral movement of the spindle transversely of the axis of rotation.

What is claimed is:

1. A balance wheel mechanism for a clock work, comprising, in combination: a balance wheel having a spindle having tips on both ends thereof, stationary bearings supporting said spindle for oscillation about a vertical aixs, said bearings having portions surrounding said tips to prevent lateral movements of said balance wheel transversely to said axis, a helical spring supporting said balance wheel longitudinally of said spindle, said helical spring surrounding said spindle and having two halves wound in opposite direction to each other, and a support secured to one half of said helical spring, the other half of said helical spring being secured to said balance wheel.

2. A balance wheel mechanism as claimed in claim 1, said spindle having cylindrical tips, said bearings being provided with bores surrounding said cylindrical tips of said spindle.

3. A balance wheel mechanism as claimed in claim 1, said spindle having conical tips, said bearings having conical recesses mating with said conical tips of said spindle.

4. A balance wheel mechanism for a clock work, comprising in combination: a balance wheel having a spindle, stationary supporting means supporting said spindle for oscillation about a vertical axis, said supporting means guiding the spindle to prevent lateral movements of said balance wheel transversely to said axis but to permit slight vertical movements, a helical spring supporting said balance wheel longitudinally of said spindle, said helical spring surrounding said spindle and having two halves wound in opposite direction to each other, and a support secured to one half of said helical spring, the other half of said helical spring being secured to said balance wheel.

References Cited in the file of this patent
UNITED STATES PATENTS

| | | |
|---|---|---|
| 30,247 | Reed | Oct. 2, 1860 |
| 224,793 | Peabody | Feb. 24, 1880 |
| 278,173 | Osgood | May 22, 1883 |
| 1,409,242 | Sanborn | Mar. 14, 1922 |

FOREIGN PATENTS

| | | |
|---|---|---|
| 551,886 | Great Britain | Mar. 15, 1943 |
| 709,493 | Germany | Aug. 18, 1941 |